United States Patent [19]

Journee et al.

[11] Patent Number: 5,339,489
[45] Date of Patent: Aug. 23, 1994

[54] SCREEN WIPING APPARATUS WITH ADJUSTABLE WIPER FORCE

[75] Inventors: Maurice Journee, Reilly; Jean-Pierre Jehannet, Vernon, both of France

[73] Assignee: Paul Journee, S.A., Colombes, France

[21] Appl. No.: 22,550

[22] Filed: Feb. 25, 1993

[30] Foreign Application Priority Data

Feb. 28, 1992 [FR] France .................... 92 02337

[51] Int. Cl.⁵ .............................. B60S 1/32
[52] U.S. Cl. ...................... 15/250.2; 15/250.35
[58] Field of Search ........... 15/250.20, 250.35, 250.19, 15/250.34, 250.21, 250.23

[56] References Cited

U.S. PATENT DOCUMENTS 5,056,182 10/1991 Fukumoto et al. ............ 15/250.20

FOREIGN PATENT DOCUMENTS

| 1938618 | 2/1971 | Fed. Rep. of Germany . |
| 4032655 | 4/1991 | Fed. Rep. of Germany . |
| 61-125952 | 6/1986 | Japan . |
| 122852 | 6/1987 | Japan .................. 15/250.20 |
| 134355 | 6/1987 | Japan .................. 15/250.20 |
| 2180442 | 4/1987 | United Kingdom . |

Primary Examiner—Timothy F. Simone
Assistant Examiner—Gary K. Graham
Attorney, Agent, or Firm—Morgan & Finnegan

[57] ABSTRACT

A screen wiping apparatus comprises a wiper arm which carries at least one wiper blade. The wiper arm is articulated about a pivot axis on a drive head for driving the wiper arm in oscillating movement. A substantially constant wiping torque is applied to the wiper arm by a spring. The apparatus also includes means for applying a complementary torque to the wiper arm so as to modify the actual wiping force applied to the wiper blade. This complementary torque applying means includes an actuator having an output member, which is coupled to the wiper arm through a connecting member. The connecting member includes a working surface which co-operates with a complementary torque transmitting member, typically in the form of a lever, which is coupled to the wiper arm and which is pivotable with respect to the latter against the action of a loading spring.

25 Claims, 5 Drawing Sheets

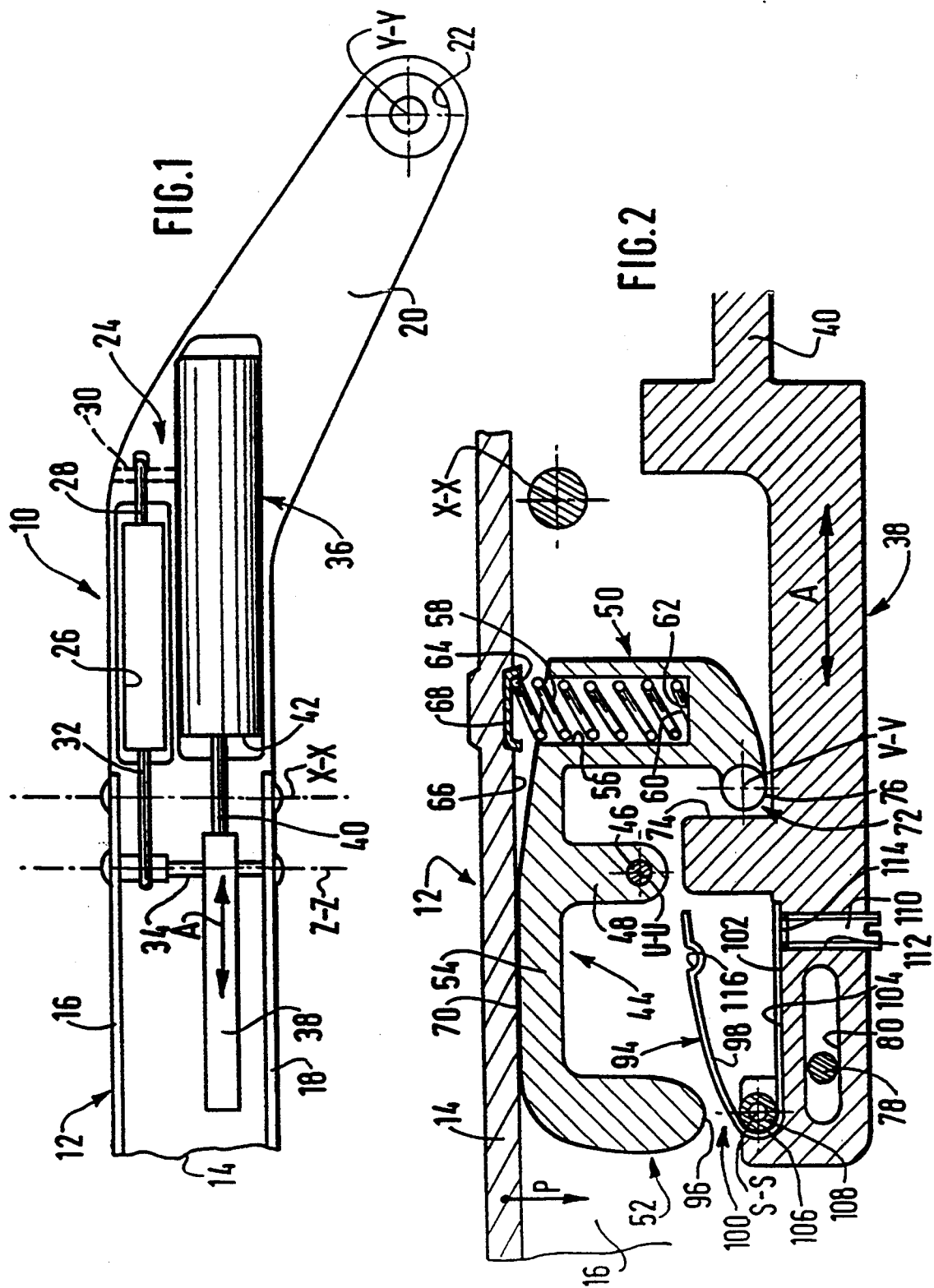

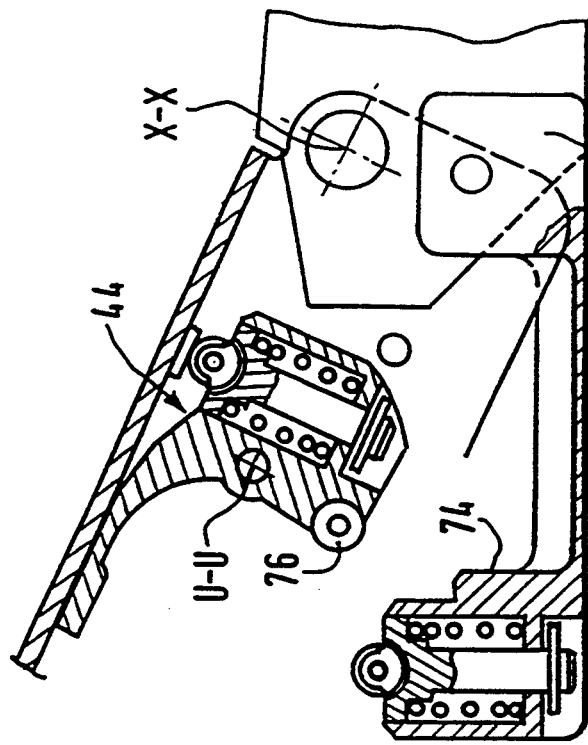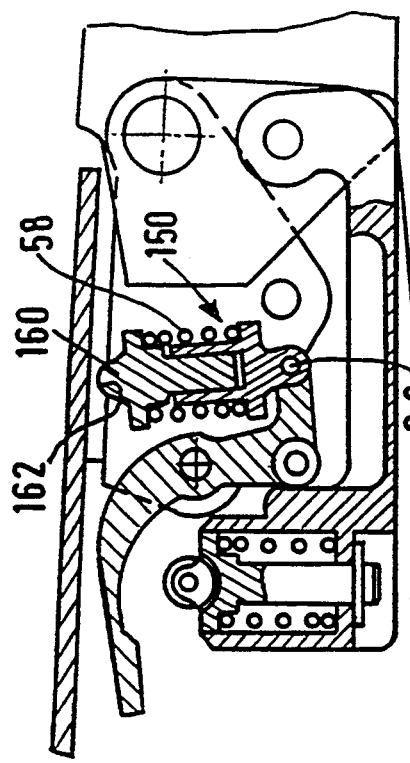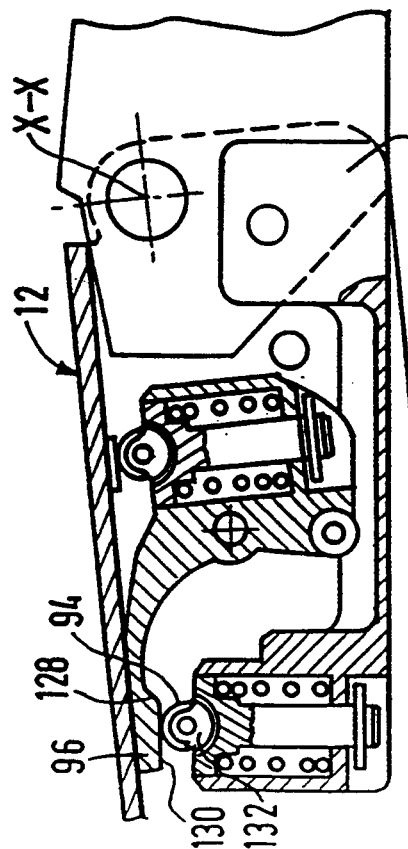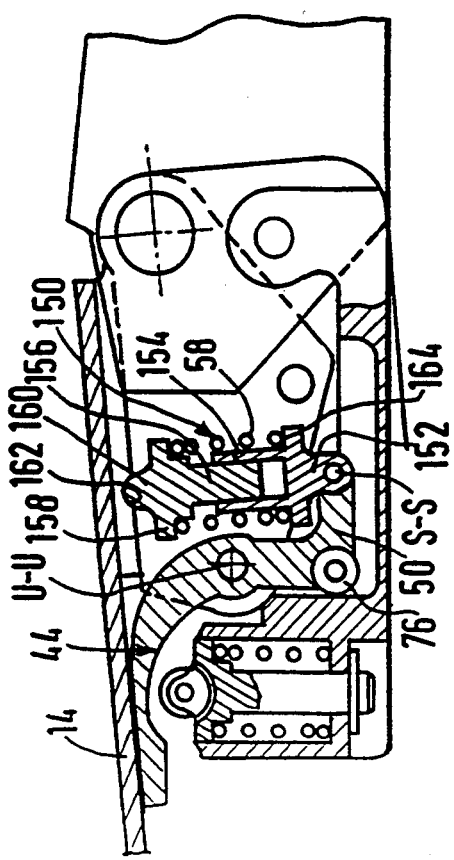

SCREEN WIPING APPARATUS WITH ADJUSTABLE WIPER FORCE

FIELD OF THE INVENTION

The present invention relates to screen wiping apparatus, particularly though not exclusively for motor vehicles.

More especially, the invention relates to screen wiping apparatus of the kind which comprises at least one wiper blade having a wiping strip, which is mounted for example on a blade carrier comprising a set of stirrups carried by a wiper arm, the latter being articulated, about a pivot axis; on a driving head of the screen wiping apparatus. This apparatus (more commonly, a screen wiper) is subjected to alternating or oscillating rotational movement derived from a drive spindle connected to the drive head, so that the blade sweeps in to and fro movement across a surface to be wiped or swept, referred to herein as a swept surface and consisting for example of the windshield of a motor vehicle.

BACKGROUND OF THE INVENTION

In order to obtain correct wiping of the swept surface, it is necessary that the wiping strip of the wiper blade should be applied on the swept surface with a substantial pressing, or wiping, force. To this end at least one spring is usually provided, for example a helical tension spring. This spring is disposed between the driving head and the wiper arm, and in practice it applies a substantially constant nominal wiping torque to the wiper arm about the pivot axis of the latter, so as to urge the wiping strip of the blade into contact with the swept surface.

The design of this wiping apparatus is such that the wiping strip is applied not only during the wiping movement over the swept surface, but also when the windshield wiper is in its rest or parked position. Because this nominal wiping force is exerted on the wiping strip at all times, even when the wiper is parked, it is found that the strip adopts and retains a residual deformation resulting from the bending of its profile against the swept surface. This results in a deterioration in the effectiveness of the wiping operation. It is accordingly desirable to be able to reduce the nominal wiping force which is applied to the wiping strip when the wiper is parked.

In addition, the quality of the wiping operation depends in operation on the magnitude of the wiping force applied to the wiping strip, in particular as a function of the speed of travel of the vehicle, and as a function of the frequency of the oscillating movement of the wiper itself.

It is known to augment the wiping force by the use of aerodynamic attachments which are mounted on the wiper arm. However, these devices do not enable the value of the wiping force to be controlled with any precision. In particular, they do not provide any facility for making controlled adjustments to the value of this force in response to any operating parameter of the vehicle.

In order to overcome the drawbacks mentioned above, it has already been proposed to provide a screen wiping apparatus of the type mentioned above, in which the means which are arranged between the driving head and the wiper arm, so as to apply a wiping torque to the latter, include at least one spring which applies to the wiper arm a nominal wiping torque that is substantially constant, together with a means for applying a complementary torque to the wiper arm. The algebraic value of this complementary torque is adjustable in such a way that the value of the wiping torque can be either increased or reduced, according to (in particular) an operating parameter of the vehicle.

The complementary torque applying means includes, for example, an actuator which is associated with the driving head, and which includes an output member (typically in the form of a ram) which is connected to the wiper arm. Although such an arrangement is to a great extent satisfactory, it is found that the whole of the apparatus is subjected to cyclic forces, which result in particular from the curved shape of the windshield. While the wiper is operating, this curved shape gives rise to cyclic pivoting, at a small amplitude, of the wiper arm about its pivot axis. These oscillations of the wiper arm result in cyclic stresses being applied to the actuator, and especially to the anchorage of the body of the actuator on the driving head.

DISCUSSION OF THE INVENTION

An object of the invention is to overcome this drawback.

According to the invention, a screen wiping apparatus, especially for a motor vehicle, of the type comprising: a screen wiper arm which carries at least one wiper blade and which is articulated about a pivot axis, on a driving head of the wiper arm; main torque applying means, arranged between the driving head and the wiper arm and comprising at least one spring for applying a substantially constant nominal wiping torque to the wiper arm; and complementary torque applying means comprising an actuator, the body of which is associated with the driving head, the output member of the said actuator being connected to the wiper arm through a connecting member, is characterised in that the connecting member includes a working surface which cooperates with a complementary torque transmitting member, the latter being coupled to the wiper arm and being adapted to be displaced with respect to the wiper arm against a resilient loading force.

There follows a list of twenty-five optional, but preferred, features of the invention.

The complementary torque transmitting member is mounted on the wiper arm for pivoting movement about a pivot axis, which is parallel to the pivot axis defined between the wiper arm and the driving head, and the complementary torque transmitting member further includes an elastic loading member which urges the complementary torque transmitting member in rotation about its pivot axis.

The complementary torque transmitting member includes a torque applying branch which extends in a direction substantially at right angles to the pivot axis of the torque transmitting member, with the free end of the said branch cooperating with the said working surface of the connecting member.

The connecting member is displaceable in a working direction at right angles to the pivot axis between the wiper arm and the driving head, and the said working surface is a flat surface portion extending at right angles to the said working direction.

The free end of the said torque applying branch comprises a roller mounted for rotation about an axis of rotation, which is parallel to the pivot axis between the wiper arm and the driving head.

The elastic loading member is a helical compression spring, one end of which biases the torque applying branch, with the other end of the said spring cooperating with an engagement surface defined in the wiper arm.

The said helical spring is mounted in a longitudinal blind hole of the said torque applying branch.

A piston coaxial with the said helical spring is mounted for sliding movement in the said longitudinal hole of the torque applying branch, and the head of the said piston cooperates with the said engagement surface.

The said torque applying branch includes an arm which is articulated at one of its ends on the said torque applying branch, about a pivot axis which is parallel to the pivot axis of the complementary torque transmitting member, and the said arm carries the helical compression spring.

The said arm is a spigot which passes through the helical spring, with a piston being mounted on the said spigot for sliding movement thereon, the head of the piston being biased by the second end of the said spring so that its head cooperates with the said engagement surface, through a spherical type articulation.

The elastic loading member exerts an elastic biassing force on the complementary torque transmitting member, in abutment against an engagement surface defined in the wiper arm.

The said engagement surface comprises the inner face of the back portion of a part of the wiper arm which is formed with a U-shaped transverse cross section.

The head of the said piston includes a roller which is rotatably mounted about an axis of rotation at right angles to the sliding axis of the piston.

The said connecting member includes a second working surface which cooperates with the said complementary torque transmitting member, so as to apply to the wiper arm a complementary torque in a direction opposed to the direction of the torque which results from cooperation of the said first working surface with the complementary torque transmitting member.

The complementary torque transmitting member includes a second torque applying branch which extends in a direction substantially at right angles to the pivot axis of the complementary torque transmitting member, with the free end of the said second branch cooperating with the second working surface of the connecting member.

The two torque applying branches are parallel to each other and extend on either side of the pivot axis of the complementary torque applying member, in a direction which is substantially at right angles to the working direction in which the connecting member is displaceable.

The said second working surface is in the form of an inclined ramp.

The ramp is adapted to pivot against an elastic loading force about an axis which is parallel to the pivot axis between the wiper arm and the driving head, and which is at right angles to the line of slope of the ramp.

The ramp is defined by one of the branches of a leaf spring in the form of a hairpin, the other branch of which bears against an engagement surface of the connecting member, with a pin passing through the bend of the hairpin spring.

The second torque applying branch includes an inclined ramp which cooperates with the said second working surface.

The line of slope of the said ramp is parallel to the said working direction in which the connecting member is displaceable.

The second working surface cooperates with the inclined ramp, with a second elastic loading member interposed.

The second elastic loading member is a helical compression spring, a first end of which bears on the base of a blind bore of the connecting member, the said bore extending at right angles to the working direction of the latter, with the free end of the compression spring being in cooperation with the inclined ramp.

A piston, coaxial with the helical compression spring, is mounted for sliding movement in the said longitudinal bore of the connecting member, and the head of this piston is in cooperation with the inclined ramp.

The value of the elastic loading force is adjustable.

The said complementary torque applying means applies to the wiper arm a complementary torque capable of increasing or reducing the value of the wiping torque, in particular as a function of at least one operating parameter of the vehicle.

Further features and advantages of the invention will appear more clearly on a reading of the detailed description of preferred embodiments of the invention which follows, and which is given by way of example only and with reference to the accompanying drawings.

BRIEF DESCRIPTION OF THE DRAWINGS

FIG. 1 is a top plan view, shown partly cut away, of a screen wiping apparatus in one form according to the invention.

FIG. 2 is a diagrammatic view in partial transverse cross section, on a larger scale than FIG. 1, and showing part of the same screen wiping apparatus as is partly shown in FIG. 1.

FIGS. 8 to 13, respectively, illustrate six different relative positions of the components of the screen wiping apparatus in a preferred embodiment of the latter according to the invention.

FIGS. 14 and 15 are views similar to FIGS. 9 and 11 respectively, but in respect of a modified form of the apparatus shown in FIGS. 8 to 13.

DESCRIPTION OF PREFERRED EMBODIMENTS OF THE INVENTION

Figure 3:
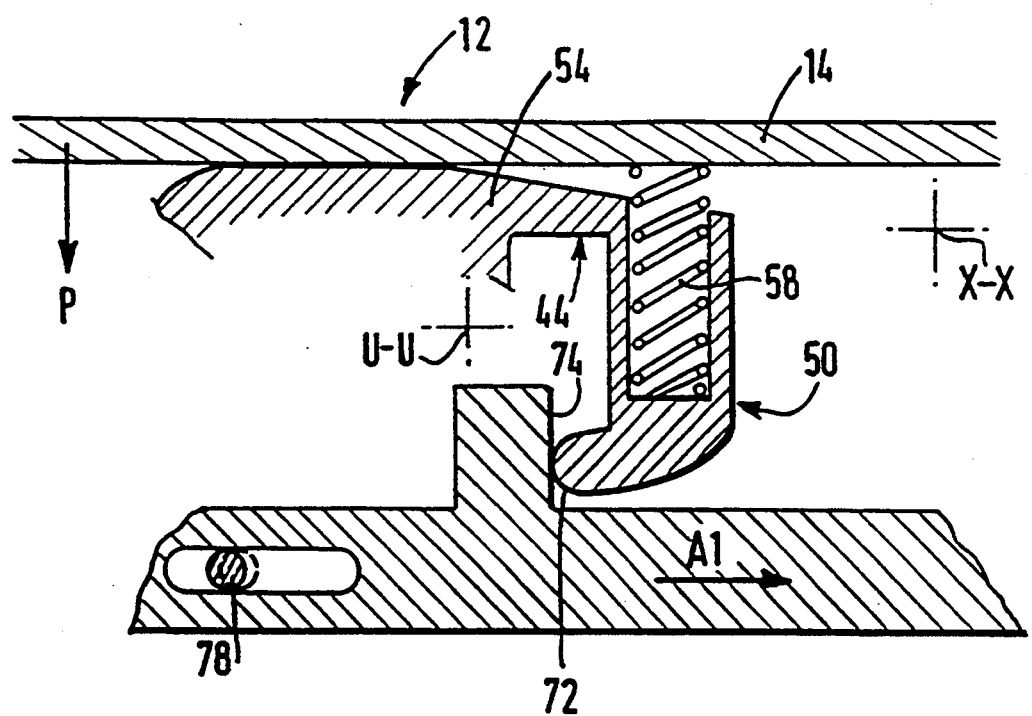
FIG. 3 is a diagrammatic partial view similar to FIG. 2, illustrating a different relative position of the components of the screen wiper, corresponding to one particular phase in its operation.

The screen wiping apparatus (or screen wiper) 10, part of which is shown in FIGS. 1 and 2, comprises a wiper arm 12 which carries a screen wiper blade (not shown). The portion of the wiper arm 12 shown in FIGS 1 and 2 is in the form of a profiled member having a hollow cross section in the form of an inverted U, comprising a back portion 14 and two flanks or side elements 16 and 18, at right angles to the back portion 14.

The wiper arm 12 is articulated on a drive head 20 defining a geometric pivot axis X—X which extends in a direction at right angles to the general longitudinal direction of the wiper arm 12. The axis X—X is located at one end of the drive head 20, at the opposite end of which the latter is formed with a bore 22 defining an axis of rotation Y—Y substantially perpendicular to the articulation axis X—X. A wiper drive spindle (not shown) is received in the bore 22 in the usual way for driving the drive head 20 in oscillating movement, the spindle being driven by any suitable means such as a conventional wiper motor (not shown).

Again in a known manner, the screen wiping apparatus 10 includes pressure means 24 for applying a wiping force P to the arm 12. The value of this wiping force P is substantially constant, and it is applied in a direction which is oriented towards the surface to be swept (not shown). This surface, typically a windshield of a motor vehicle, will be referred to as a swept surface. In this example, the pressure means 24 comprises a helical tension spring 26, one end 28 of which is hooked over a transverse pin 30 carried by the drive head 20. The other end 32 of the spring 26 is hooked over another transverse pin 34, carried by the wiper arm 12. The axis Z—Z of the pin 34 lies below the articulation axis X—X as seen in FIG. 2, that is to say between the axis X—X and the swept surface, so that the spring 26 applies a nominal torque to the wiper arm 12 about its articulation axis X—X, whereby to apply the wiping force P to the wiping strip of the wiper blade.

The screen wiping apparatus 10 also includes means for applying a complementary torque to the wiper arm 12, which enables the net value of the wiping force to be varied. These force varying means essentially comprise an actuator 36 which is arranged in the drive head 20, together with a connecting member 38 which is shown diagrammatically in FIG. 1. The connecting member 38 joins the output member, or actuating ram, 40 of the actuator 36 to the wiper arm 12. In the embodiment shown in FIG. 1, the actuator 36 is of the linear type, defining a general working direction A which is at right angles to the axis X—X on which the wiper arm 12 is articulated to the drive head 20. The ram 40 of the actuator 36 projects from the body 42 of the actuator in a direction parallel to the direction A.

As can be seen in FIG. 2, the connecting member 38 cooperates with a complementary torque transmitting member 44 for transmitting a complementary torque to the wiper arm 12. The torque transmitting member 44 is in the form of a lever or crank which is mounted, for pivoting movement with respect to the wiper arm 12, on a pivot pin 46 having a geometric pivot axis U—U parallel to the articulation axis X—X. The pivot pin 46 extends through a hole formed in a central branch 48 of the member 44. The branch 48 is joined to a first torque applying branch 50 of the member 44, and also to a second torque applying branch 52 of the member 44. These two branches 50 and 52 extend substantially parallel to each other and in a direction which is substantially at right angles to the working direction A of the connecting member 38.

The two torque applying branches 50 and 52 are joined to the central branch 48 of the lever 44 through a connecting branch 54, which extends in a direction substantially parallel to the back portion 14 of the wiper arm 12. A blind longitudinal hole 56 is formed in the first torque applying branch 50, and a helical compression spring 58 is received in this hole 56. A first end 60 of the spring 58 bears against the base 62 of the blind hole 56, while its opposite end 64 bears against the inner face 66 of the back element 14 of the wiper arm 12, with a thrust cup 68 being interposed between the spring 58 and the face 66. As can clearly be seen from FIG. 2, the compression spring 58 biases the lever 44 in rotation about its pivot axis U—U in the clockwise direction in the Figure.

In its neutral or rest position shown in FIG. 2, the torque transmitting lever 44 is therefore urged by the spring 58 into engagement against the inner face 66 of the back portion 14, with the upper edge 70 of the connecting branch 54 lying along the inner face 66 that joins the central branch 48 of the lever to its second torque applying branch 52.

The free end 72 of the first torque applying branch 50 lies in facing relationship to a first working surface 74 of the connecting member 38. The working surface 78 is a flat surface portion of the member 38, extending in a plane at right angles to the working direction A of the connecting member 38, and the free end 72 of the branch 50 may for example be provided with a roller 76 which is freely rotatable on an axis of rotation V—V parallel to the pivot axis U—U.

The connecting member 38 is guided in its movement in the direction A by a guide finger 78 which is connected to the drive head 20, and which is received in a longitudinal guide slot 80 of the member 38. The reason for the cooperation between the free end 72 of the branch 50 and the first working surface 74 is to enable a complementary torque which augments the wiping force P to be applied to the wiper arm 12. To this end, the actuator 36 causes the connecting member 38 to be displaced in the direction A1 (as indicated in FIG. 3), so as to bring the working surface 74 into contact with the free end 72.

When the working surface 74 exerts a thrust on the free end 72 of the branch 50, an actuating torque is applied to the torque transmitting lever 44, so as to tend to cause the latter to pivot about its axis U—U in the anti-clockwise direction (with reference to FIG. 3).

The elastic constant of the loading spring 58 is so selected that the spring applies a reaction torque of a predetermined value to the lever 44, so as to tend to bias it about the axis U—U in the clockwise direction with reference to FIG. 3. This elastic constant, or stiffness, of the spring 58 is such that the reaction torque will be slightly greater than the motor torque which is applied to the lever 44 by the working surface 74, so that the connecting member 38 enables the above mentioned complementary torque, augmenting the wiping force P, to be applied to the wiper arm 12. Accordingly, the action of the working surface 74 on the free end 72 of the arm 50 ensures that this complementary torque will be transmitted to the wiper arm 12.

During the wiping movement of the wiper, cyclic angular movements of the wiper arm 12 about its pivot axis X—X resulting from the curved shape of the windshield are converted into cyclic movements of the free end 72 with respect to the working surface 74. Since the torque applying branch 50 of the lever 44 extends between the pivot axis X—X and the working surface 74, these cyclic movements would have the disadvantage of transmitting sympathetic cyclic movements to the actuator 36 via the connecting member 38.

Figure 4:
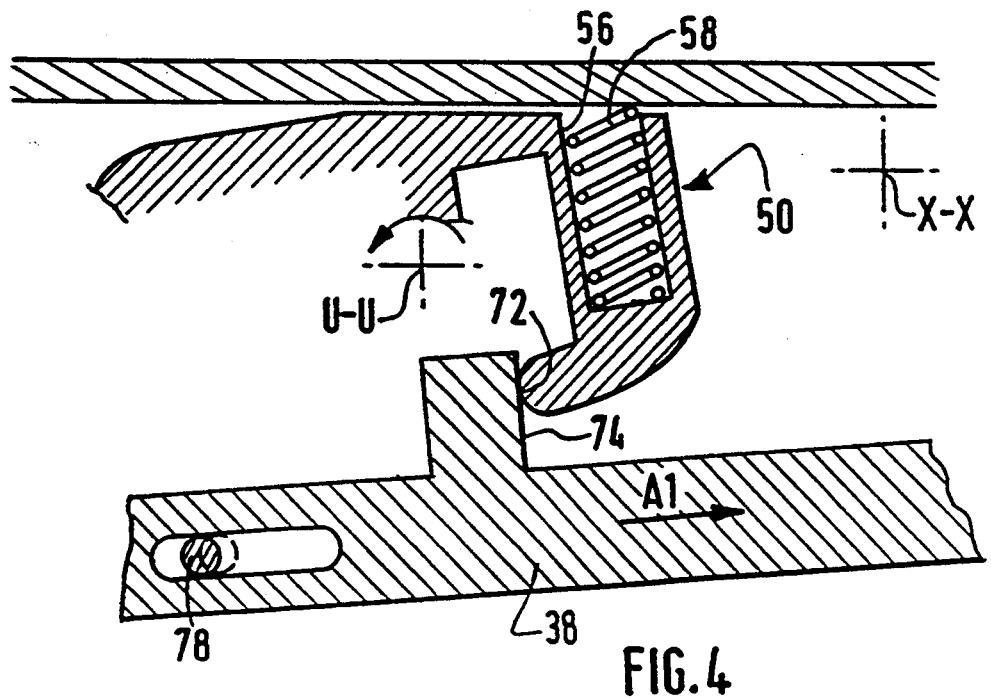
FIG. 4 is a view similar to FIG. 3 but shows the wiper in another phase of its operation.

However, due to the presence of the loading spring 58, any displacement of the wiper arm 12 about the axis X—X that normally gives rise to an increase in the complementary torque to a value that exceeds the value determined by the choice of stiffness of the spring 58, will be converted into a pivoting movement of the lever 44 about its own pivot axis U—U in the anti-clockwise sense (with reference to FIG. 2). This effect is illustrated in FIG. 4, which shows the loading spring 58 being compressed within the blind hole 56, so that the point of contact between the free end 72 and the first working surface 74 is displaced upwardly (with reference to FIGS. 3 and 4).

Figure 5:
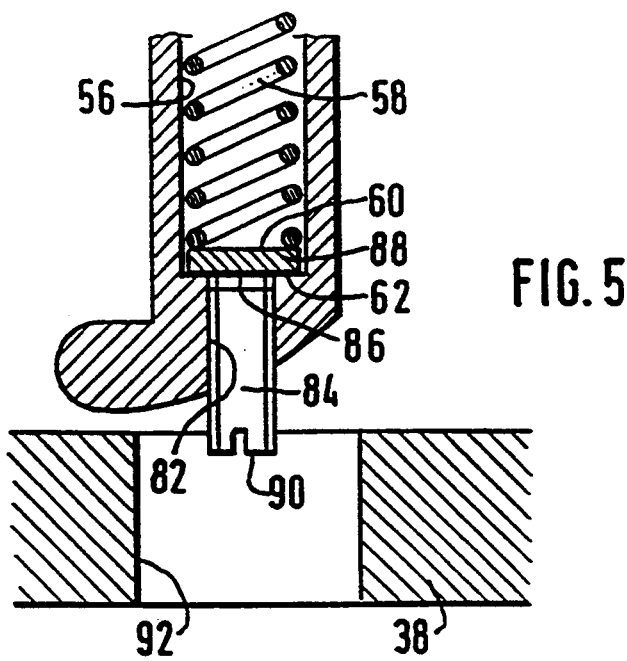
FIG. 5 is a detail view showing a modification to the screen wiping apparatus shown in FIG. 2.

Referring now to FIG. 5, this Figure shows a modification consisting of means for adjusting the value of the load exerted by the spring 58. For this purpose, the base 62 of the blind hole 56 is pierced with a threaded hole 82, which receives an adjusting screw 84. The end face 86 of this screw 84 acts on a first end 60 of the spring 58 through a thrust disc 88. An aperture 92 is also provided through the connecting member 38, so as to give access to the head 90 of the adjusting screw 84.

Figure 6:
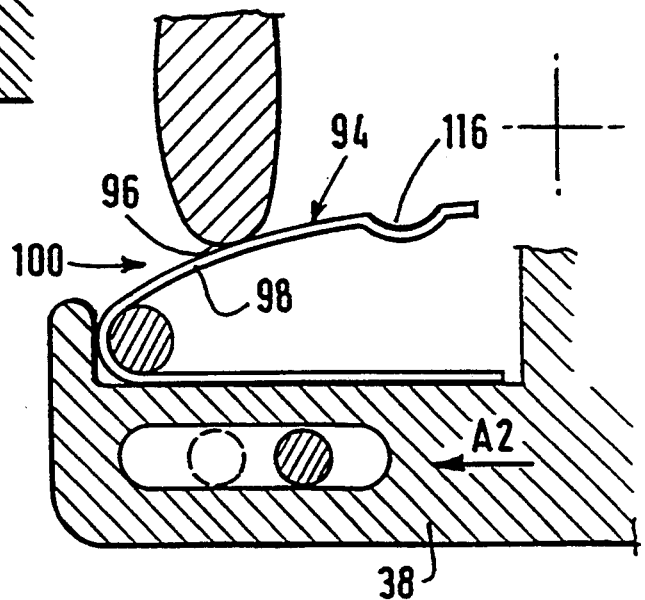
FIG. 6 is a detail view on a larger scale, similar to that in FIG. 2 but showing relative positions of the components of the screen wiping apparatus corresponding to another phase in its operation.
Figure 7:
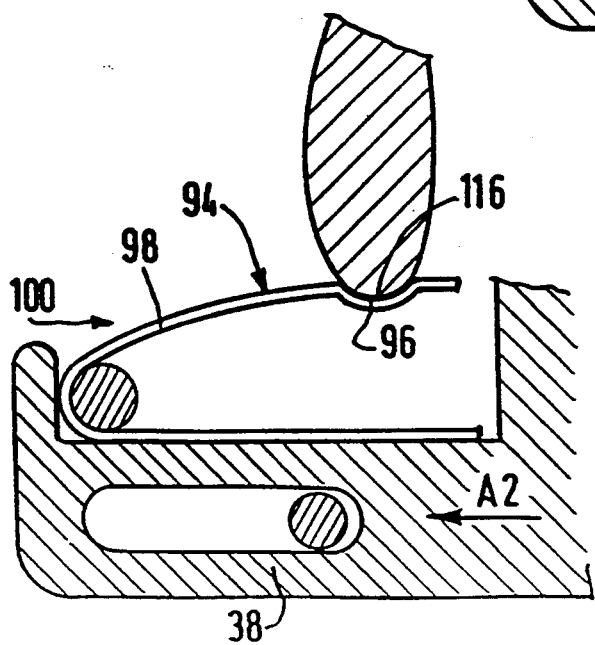
FIG. 7 is a view similar to FIG. 6, but shows a further phase in its operation.

Referring once again to FIG. 2, it will be seen that the connecting member 38 has a second working surface 94, which is arranged close to its free end. This working surface 94 is provided for the purpose of cooperating with the free end 96 of the second torque applying branch 52 of the lever 44. The surface 94 is in the form of a ramp which is inclined with respect to the working direction A of the member 38. In the embodiment shown in FIG. 2 (and also in FIGS. 6 and 7), the ramp 94 consists of a first branch 98 of a leaf spring 100 in the form of a hairpin, having a second branch 102 which bears against a flat surface portion 104 of the connecting member 38. The two branches 98 and 102 of the hairpin spring are joined by a bend 106, which extends around a pin 108 so that the hairpin spring 100 can pivot about a pivot axis S—S of the pin 108. Cooperation of the pin 108 with the internal face of the bend 106 defines the pivot point or fulcrum about which the ramp 94 deflects by elastic deformation.

An adjusting screw 110 is screwed into a threaded hole 112 formed through the connecting member 38. The upper end 114 of the screw 110 can engage the corresponding face of the second branch 102 of the hairpin spring 100, so as to adjust the angular position of the spring 100 about its pivot axis S—S. Thus adjustment of the screw 110 alters the inclination of the ramp 94.

It will be noted that the second working surface or ramp 94 is formed with a depression 116 close to the free end of the branch 98 of the hairpin spring.

The purpose of the cooperation of the second working surface 94 with the free end 96 of the second torque applying branch 52 of the lever 44 is to apply a complementary torque to the wiper arm 12, in opposition to the torque applied to the arm by the spring 26, so as to reduce the net wiping force. For this purpose, the actuator 36 displaces the connecting member 38 in the direction A2 shown in FIGS. 6 and 7, until the free end 96 of the branch 52 comes into engagement with the ramp 94. The result of this engagement is to apply to the wiper arm 12 a torque which urges it to rotate about its pivot axis X—X in the clockwise direction with reference to the drawings.

The depression 116 formed in the ramp 94 determines the parking position of the wiper arm 12, in which the free end 96 is received in the depression 116 and applies a maximum compensating torque to the wiper arm 12.

Because the second working surface 94 takes the form of a branch 98 of a hairpin-shaped leaf spring, this spring can be loaded by the value of the complementary torque, the actual value of which can be adjusted by means of the screw 110.

Reference will now be made to the preferred embodiment of the invention shown in FIGS. 8 to 13. In these Figures, those elements which are identical or equivalent to elements described above with reference to FIGS. 1 to 7 are indicated by the same references. As will be clear from FIGS. 8 to 13, the loading spring 58 is carried axially in the blind hole 56, around the rod 120 of a piston which is mounted for sliding movement in the hole 56. This piston has a head 122 on which a roller 124 is mounted, for rotation about an axis W—W parallel to the pivot axis U—U, and at right angles to the axis of the piston rod 120. The rotatable roller 124 cooperates with a bearing pad 126 on the inner face 66 of the back portion 14 of the wiper arm 12. The free end 96 of the second torque applying branch 52 of the lever 44 here includes an inclined ramp 128 which is extended by a counter ramp 130.

The second working surface of the connecting member 38 here consists of the outer cylindrical surface 94 of a roller 132, which is mounted for rotation about an axis of rotation T—T at right angles to the working direction A of the connecting member 38. This roller 132 is mounted in the head 134 of another piston, the piston rod 136 of which extends coaxially within a blind bore 138 which is formed in the connecting member 38 close to the free end 140 of the latter. A helical compression spring 142 is mounted in this blind bore 138, and has a first end which bears against the base of the bore. The other or second end 146 of the spring 142 biases the piston head 134 and the roller 132 axially upwardly with respect to the drawings.

Figure 8:
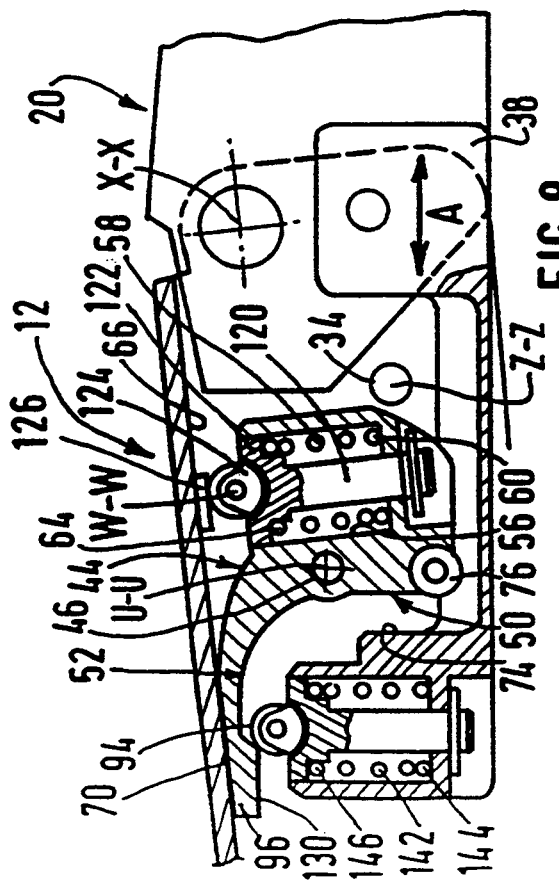

FIG. 8 shows this arrangement in its rest or neutral position, corresponding to FIG. 2. When it is desired to apply a complementary torque so as to increase the wiping force, the connecting member 38 is driven by the actuator 38 towards the right in FIG. 8, until it reaches the position shown in FIG. 9, in which the roller 78 is in engagement with the first working surface 74.

Figure 9:
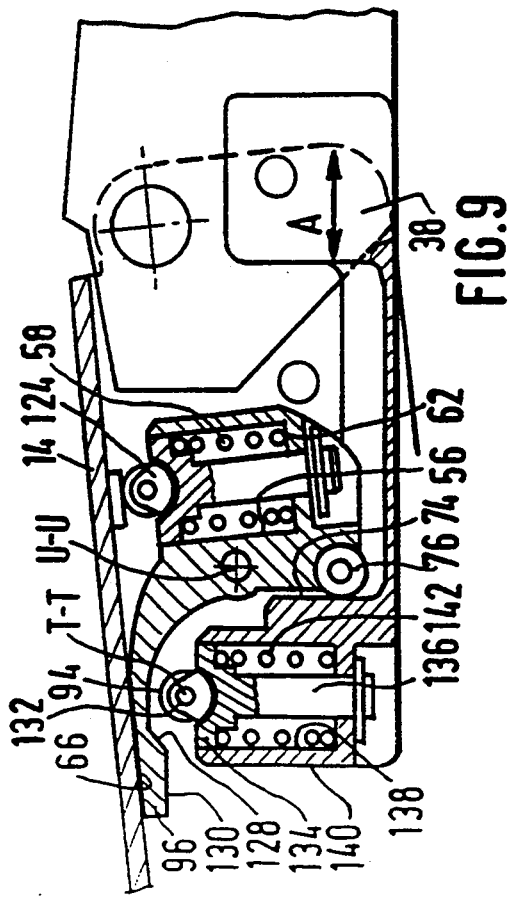
Figure 10:
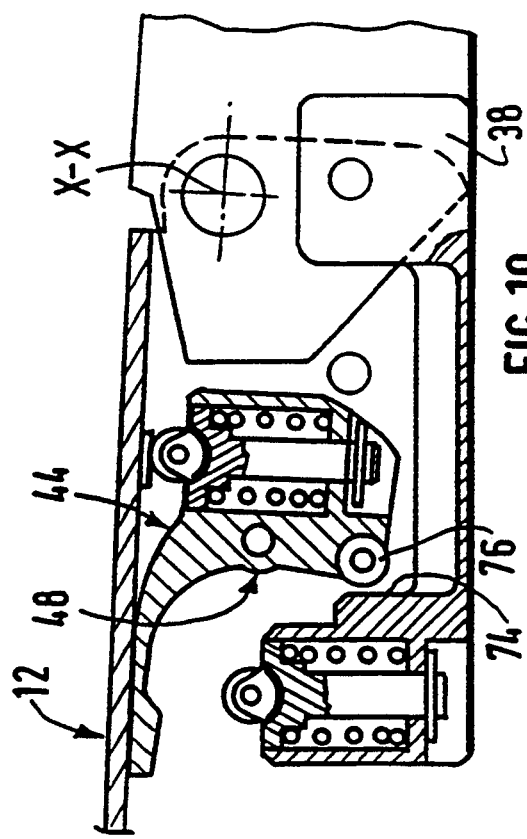
Figure 11:
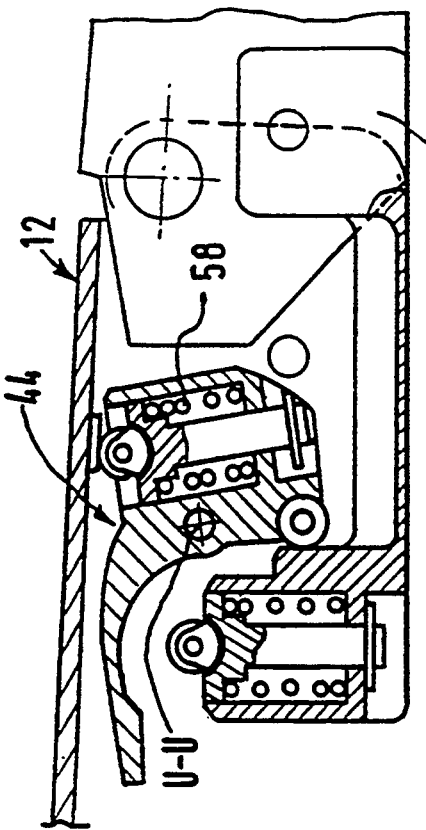

FIGS. 10 and 11 are views similar to those in FIGS. 8 and 9, but relate to a windshield wiper which is differently sited with respect to the windshield, that is to say in a position in which the curvature of the windshield is different. In FIG. 10, the lever 44 is still in its neutral position, and it is assumed that the wiper arm 12 has pivoted slightly about its pivot axis X—X in the clockwise direction with respect to the drawings. Here, the roller 76 of the lever 44 remains spaced away from the working surface 74 of the connecting member 38. In FIG. 11, which corresponds to the application of a complementary torque to the wiper arm 12 by the connecting member 38, it is assumed that, as in the case of FIG. 4, the lever 44 has pivoted about its pivot axis U—U in the anti-clockwise direction as seen in the drawings, against the loading force applied to it by the spring 58.

Referring now to FIG. 12, this shows the parking position of the wiper, in which the actuator 36 has caused the connecting member 38 to be displaced towards the left, the second working surface 94 of the roller 138 having (by cooperation with the ramp portions 128 and 130) caused the wiper arm 12 to pivot about its pivot axis X—X in the clockwise direction as shown in the drawings, so as to produce a compensating effect, that is to say a reduction in the wiping force below the value P.

With reference to FIG. 13, this shows the apparatus in its "intervention" or "repair" position, in which the user has pivoted the wiper arm 12, carrying the lever 44, about the pivot axis X—X to its fullest extent, for example for the purpose of replacing the wiper blade.

Referring now to FIGS. 14 and 15, these show a modified version of the embodiment shown in FIGS. 9 and 11. In FIGS. 14 and 15, the torque applying branch 50 of the lever 44 is provided with an arm 150, one end 152 of which is articulated on the branch 50 about a pivot axis S—S. The arm 150 is in the form of a hollow cylindrical spigot 154. The piston rod 156 of a piston is mounted for sliding movement inside this spigot 154. This piston has a head 158 which spigot 154. T a spherical boss 160. This boss 160 is received in a complementary seating 162 which is formed in the inner face of the back portion 14 of the wiper arm 12. The helical loading spring 58 is interposed between a radial engagement shoulder 164 of the arm 150 and the piston head 158. Operation of this embodiment shown in FIGS. 14 and 15 is identical to that of the arrangement shown in FIGS. 9 and 11.

It should be noted that the only function of the loading springs is to determine, firstly, limiting values of the complementary torque which is applied by means of the actuator 36, and secondly, to return the lever 44 to its neutral position. The loading springs play no part in the actual application of a complementary torque to the wiper arm 12.

What is claimed is:

1. A screen wiping apparatus for a motor vehicle, said apparatus comprising: an elongated wiper arm; at least one wiper blade carried by the wiper arm; a driving head for the wiper arm; means articulating the wiper arm and driving head together and defining a first pivot axis for pivoting movement of the wiper arm with respect to the driving head; and wiping torque applying means mounted between and to the driving head and the wiper arm for applying a wiping torque to the wider arm about said first pivot axis, said wiping torque applying means comprising at least one first elastic loading means for applying to the wiper arm a substantially constant nominal wiping torque, together with complementary torque applying means, said complementary torque applying means comprising an elongated actuator and a connecting member, the actuator comprising a body coupled to the driving head and an output member movably mounted in the body for movement with respect to the body, said connecting member coupling the output member of the actuator to the wiper arm, wherein the complementary torque applying means further includes: a complementary torque transmitting member; said complementary torque transmitting member being pivotably mounted on the wiper arm for pivotal displacement with respect thereto about a second pivot axis which is laterally spaced from said first pivot axis; and second elastic loading means mounted between and to the complementary torque transmitting member and the wiper arm for biasing said complementary torque transmitting member about said second pivot axis, said connecting member defining a first working surface for engagement with the complementary torque transmitting member, such that said complementary torque transmitting member is displaceable with respect to the wiper arm, by said actuator against an elastic loading force exerted by said second loading means.

2. A screen wiping apparatus according to claim 1, wherein the second pivot axis is parallel to said first pivot axis.

3. A screen wiping apparatus according to claim 2, wherein the complementary torque transmitting member comprises a first torque applying branch, extending in a direction substantially at right angles to said second pivot axis and having a free end cooperating with said first working surface of the connecting member.

4. A screen wiping apparatus according to claim 3, wherein the actuator defines a working direction of displacement of said connecting member, at right angles to said first pivot axis, the first working surface being a flat surface portion of the connecting member at right angles to said working direction.

5. A screen wiping apparatus according to claim 4, further including a first roller, the free end of said first torque applying branch defining a first axis of rotation parallel to said first pivot axis, said first roller being mounted on said free end for rotation about the first axis of rotation.

6. A screen wiping apparatus according to claim 4, wherein said second elastic loading means is a helical compression spring defining a first end and a second end thereof, with its first end being applied to the first torque applying branch for exerting a force thereon, the wiper arm defining an engagement surface, and the second end of the helical compression spring being in engagement with said engagement surface.

7. A screen wiping apparatus according to claim 6, wherein the first torque applying branch is formed with a longitudinal blind hole, said helical compression spring being mounted in said blind hole.

8. A screen wiping apparatus according to claim 7, further including a first piston mounted for sliding movement in said blind hole of the first torque applying branch coaxially with the helical compression spring, said first piston having a head for engagement with said engagement surface.

9. A screen wiping apparatus according to claim 8, further including a second roller, the head of the first piston defining a second axis of rotation at right angles to the direction of sliding movement of the first piston, and mounting said second roller for rotation of the second roller about said second axis of rotation.

10. A screen wiping apparatus according to claim 6, wherein the first torque applying branch includes an arm having a first end and a second end, the first torque applying arm including means defining a third pivot axis parallel to said second pivot axis and mounting said first end of the arm on the first torque applying branch for pivoting movement thereon, with the helical compression spring being carried by said arm.

11. A screen wiping apparatus according to claim 10, wherein said arm is in the form of a spigot extending within the helical compression spring, and further including a piston carried by the spigot for sliding movement therein, the piston having a head against which the second end of the compression spring bears and which includes a spherical type articulating means engaging said engagement surface of the wiper arm.

12. A screen wiping apparatus according to claim 6, wherein the second elastic loading means urges the complementary torque transmitting member about said second pivot axis into abutment against said engagement surface.

13. A screen wiping apparatus according to claim 12, wherein the wiper arm includes a portion defining a U-shaped transverse cross section, which includes a back portion having an inner face defining said engagement surface.

14. A screen wiping apparatus according to claim 1, wherein said connecting member defines a second working surface for engagement with the complementary torque transmitting member, whereby to apply to the wiper arm a complementary torque in a direction opposite to the direction of the torque which results from engagement of said first working surface with the complementary torque transmitting member.

15. A screen wiping apparatus according to claim 14, wherein the second working surface is an included first ramp defining a line of slope thereof.

16. A screen wiping apparatus according to claim 15, wherein the connecting member defines a third pivot axis parallel to said first pivot axis and at right angles to the line of slope of said first ramp, the first ramp being mounted on the connecting member for pivoting movement about said third pivot axis against said loading force.

17. A screen wiping apparatus according to claim 16, further including a leaf spring in the form of a hairpin defining a first branch of the spring, a second branch of the spring, and a bend joining said first and second branches of the spring, and a pin passing through said bend mounting said spring on said connecting member, said connecting member defining an engagement surface of the connecting member, the first branch of the spring defining said first ramp, and its second branch being in engagement against said engagement surface of the connecting member.

18. A screen wiping apparatus according to claim 2, wherein the complementary torque transmitting member comprises a first torque applying branch, extending in a direction substantially at right angles to said second pivot axis and having a free end for engagement with said first working surface of the connecting member, and said connecting member defines a second working surface for engagement with the complementary torque transmitting member, whereby to apply to the wiper arm a complementary torque in a direction opposite to the direction of the torque which results from engagement of said first working surface with the complementary torque transmitting member, the complementary torque transmitting member further including a second torque applying branch extending in a direction substantially at right angles to said second pivot axis and defining a free end of the second branch in engagement with said second working surface of the connecting member.

19. A screen wiping apparatus according to claim 18, wherein the actuator defines a working direction of displacement of said connecting member, at right angles to said first pivot axis, the first working surface being a flat surface portion of the connecting member at right angles to said working direction, said first and second torque applying branches being parallel to each other and extending on either side of said second pivot axis in a direction substantially at right angles to said working direction of displacement of the connecting member.

20. A screen wiping apparatus according to claim 18, wherein the second torque applying branch defines an inclined ramp for engagement with said second working surface.

21. A screen wiping apparatus according to claim 20, wherein the actuator defines a working direction of displacement of said connecting member, at right angles to said first pivot axis, the first working surface being a flat surface portion at right angles to said working direction, the line of slope of said ramp being parallel to said working direction of displacement of the connecting member.

22. A screen wiping apparatus according to claim 20, further including a second elastic loading means interposed between the second working surface and the inclined ramp, for engagement of the second working surface with the ramp through the second elastic loading means.

23. A screen wiping apparatus according to claim 22, wherein the second elastic loading means is a helical compression spring defining a first end and a second end thereof, the connecting member having a blind bore defining a base of the blind bore and extending at right angles to said working direction of the connecting member, with the first end of the helical compression spring engaging against the base of the blind bore and the open end of the helical compression spring engaging the inclined ramp.

24. A screen wiping apparatus according to claim 23, further including a piston mounted coaxially with said compression spring for sliding movement in said longitudinal bore of the connecting member, the piston having a head for engagement with the inclined ramp.

25. A screen wiping apparatus according to claim 1, including means coupled with said second elastic loading means for adjusting the loading force exerted thereby.

* * * * *